(12) United States Patent
Chang

(10) Patent No.: US 6,690,353 B2
(45) Date of Patent: Feb. 10, 2004

(54) PORTABLE COMPUTER INPUT DEVICE

(75) Inventor: Cheng-Chung Chang, Taipei Shien (TW)

(73) Assignee: Chain-Tay Technology Co., Ltd., Taipei Hsien (TW)

( * ) Notice: Subject to any disclaimer, the term of this patent is extended or adjusted under 35 U.S.C. 154(b) by 440 days.

(21) Appl. No.: 09/884,033

(22) Filed: Jun. 20, 2001

(65) Prior Publication Data
US 2002/0196236 A1 Dec. 26, 2002

(51) Int. Cl.$^7$ .............................. G09G 5/00; G06F 1/16
(52) U.S. Cl. ...................... 345/156; 345/168; 361/680; 361/683
(58) Field of Search ................. 345/156, 168; D14/333, 338, 391; 361/680, 681, 683, 686; 400/691, 692, 693, 472

(56) References Cited

U.S. PATENT DOCUMENTS

| 6,108,200 A | * | 8/2000 | Fullerton | .................... 361/686 |
|---|---|---|---|---|
| 6,121,958 A | * | 9/2000 | Clark et al. | .................. 345/168 |
| 6,398,176 B1 | * | 6/2002 | Liu | .......................... 248/284.1 |
| 6,538,642 B2 | * | 3/2003 | Tsai | ............................. 345/168 |
| 2002/0097226 A1 | * | 7/2002 | Chen | ........................... 345/168 |
| 2002/0101405 A1 | * | 8/2002 | Chang | ......................... 345/168 |
| 2002/0109961 A1 | * | 8/2002 | Glad | ........................... 361/680 |
| 2002/0122028 A1 | * | 9/2002 | Wang | ......................... 345/168 |
| 2002/0159226 A1 | * | 10/2002 | Huang et al. | ............... 361/680 |
| 2002/0163778 A1 | * | 11/2002 | Hazzard et al. | ............. 361/683 |
| 2002/0179470 A1 | * | 12/2002 | Lee | ............................. 206/320 |

* cited by examiner

Primary Examiner—Richard Hjerpe
Assistant Examiner—M. Fatahiyar
(74) Attorney, Agent, or Firm—Bacon & Thomas, PLLC

(57) ABSTRACT

A portable computer input device is characterized in having a releasable upper cover, a foldable computer mounting pad, and a signal transmission joint connectable with a flexible printed circuit board to serve conveniently mission of rapid information transmission.

6 Claims, 9 Drawing Sheets

PORTABLE COMPUTER INPUT DEVICE

BACKGROUND OF THE INVENTION

1. Field of the invention

The present invention relates to a portable computer input device comprising a keyboard, an upper cover, a computer mounting pad, and a signal transmission joint. With this structure information is rapidly input into the portable computer or a personal digital assistant (PDA) through the signal transmission joint by operation of the keyboard. The present invention is well ergonomically constructed with a releasable upper cover to acquire advantageous features of convenient thin and light, space saving structure.

2. Description of the Prior Art

In the past decade, a portable personal computer and its related device has become important personal belongings in this computerized world. In earlier days, data was input into the portable computer by hand writing which soon became too tedious in teating a large amount of data. As a result, there appeared a key board connectable with the portable computer so as to release the user from previous burden of too much hand writing for inputting data into the computer.

Such keyboards incorporative with the portable computer are essentially represented by two types, ie. A collapsible type and an non-separable type. The collapsible type is benefited by its small sized good portability, but on the other hand, frequent developing/folding operation will easily damage inner components which leads to shortening the lifetime of the input device. The non-separable type has no above mentioned shortcoming, but its bulky size brings up another problem. The non separable type is usually not welcome by users for unstability in setting up with a stand in using the computer caused by biasing of the center of gravity of the whole computer unit that occasionally results in overturning and ruining the whole computer unit.

Further to this, the signal transmission between the key board and the computer in a conventional portable computer input device depends on conductors which can only transmit simple data. A more modern sophisticated portable unit requires a more innovative design.

In order to overcome the shortcomings inherent to the conventional technique described above, the present inventor has delved into this matter with long time efforts and came to realization of the present invention.

SUMMARY OF THE INVENTION

It is an object of the present invention to provide a portable computer input device having a releasable upper cover which can be installed at four sides of the key board.

It is another object of the present invention to provide a portable computer input devie having a thin bracket plate underneath the key board for folding the keyboard and sustaining the input device of the present invention, particularly, this bracket does not increase the thickness of the keyboard when folded.

It is a further object of the present invention that signal transmission between the key board and the signal transmission joint can be carried out by a flexible printed circuit board (FPCB) such that the input device of the present invention can be adaptable to variety of portable computers and PDAS.

It is one more object of the present invention that the opening of the key board is provided with two stubs one at each side, and each stub is formed with a protuberance engageable with a respective stoppers of a setting pad so as to vary the angle formed between the key board surface and the setting pad according to the state of engagement between the protuberances and the stoppers.

In view of the above objects, the present invention comprises: a key board provided with an opening at the uppermost portion thereof with two stubs each emerging inwardly and oppositely each other from respective side, and a protuberance is formed on each stub, the keyboard is supported with a supporting plane beneath, while a plurality of keys are disposed on the upper surface of the keyboard, and a breach is formed on the upper surface of the keyboard, thereof; an upper cover of the key board provided with an opening at a proper position thereof, a guide ditch is formed at the edge of the opening, and two hooks are provided each at one side of the opening, and a hasp is provided at a proper position on the edge of the upper cover to be engaged with the breach formed on the upper surface of the keyboard by trapping therein; a mounting pad composed of a pedestal and a sustaining plate extending therefrom, a flange is formed around the edge of the sustaining plate, and a stopper is provided at each side of the pedestal; and a signal transmission joint having a signal connector thereon.

With such a structure, the signal transmission joint is articulated with the mounting pad by forming a containment hole therebetween where the two stubs of the opening of the keyboard are coupled with. The flange formed around the edge of the sustaining plate is trapped in the guide ditch of the upper cover, and the two hooks each at one side of the upper cover captures the corresponding stubs of the opening.

In the present invention, a gutter is formed at the bottom portion of the keyboard and having two fitting holes for supporting several axles of a bracket plate such that the bracket plate may turn. Besides, the protuberances of the stubs are for retaining the two stoppers of the pedestal, the angle formed between the keyboard surface and the mounting pad is adjustable according to engaging position of the stubs and the stoppers.

In the present invention, the upper cover may be installed optionally at any one of four sides of the keyboard according to contour of the keyboard, or may be removed and arrangement of individual keys on the keyboard depends on actual requirement.

In the present invention, a flexible printed circuit board can be connected to the signal connector for transmitting output/input signals.

BRIEF DESCRIPTION OF THE DRAWINGS

The drawings disclose illustrative embodiments of the present invention which serves to exemplify the various advantages and objects hereof and are as follows.

DETAILED DESCRIPTION OF THE PREFERRED EMBODIMENT

Figures 1A, 1B:
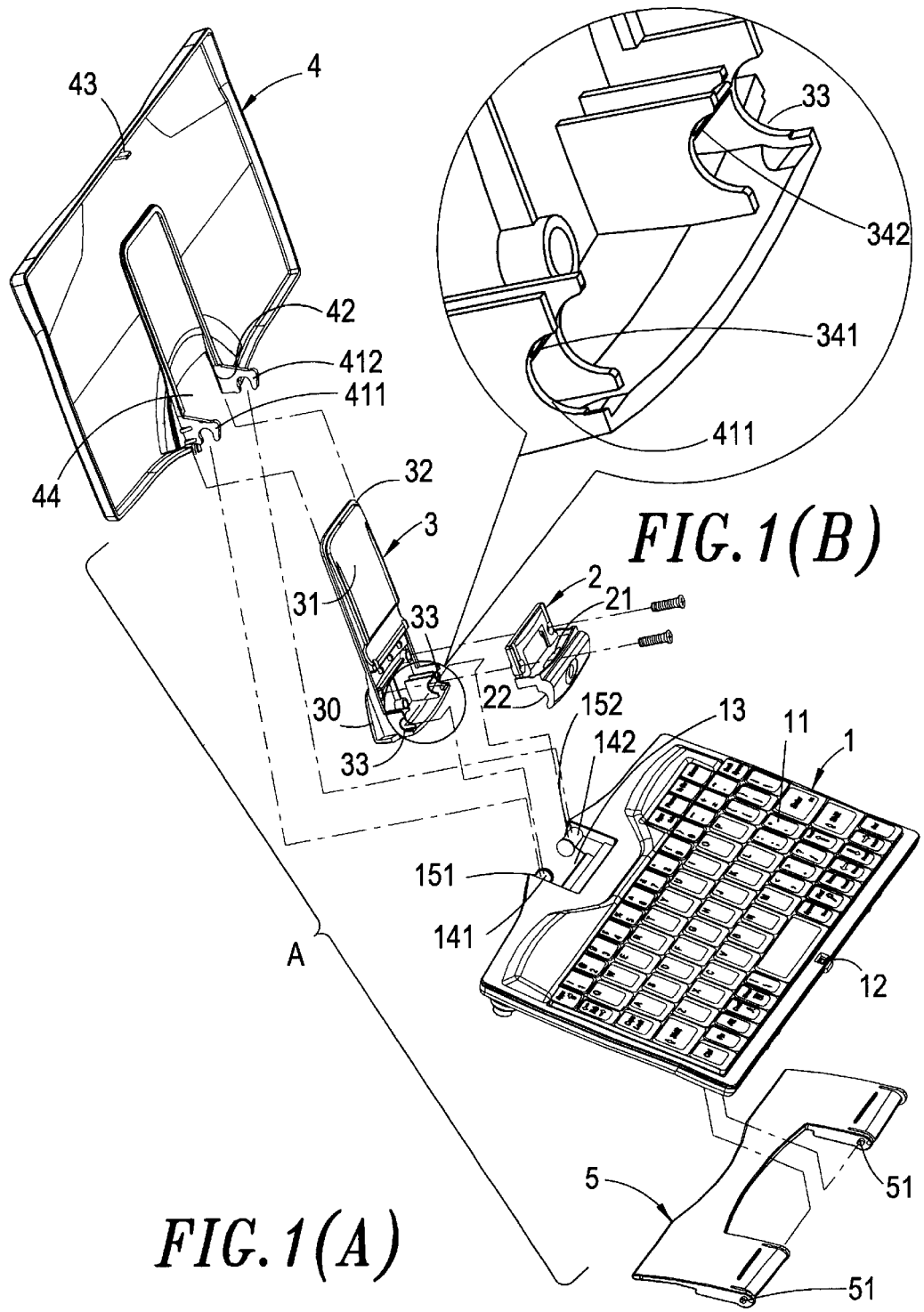
FIG. 1(A) is an exploded view showning component parts of the present invention viewed downward from the top.
FIG. 1(B) is a fragmentarily enlarged view of the nounting pad of the present invention.
Figure 2:
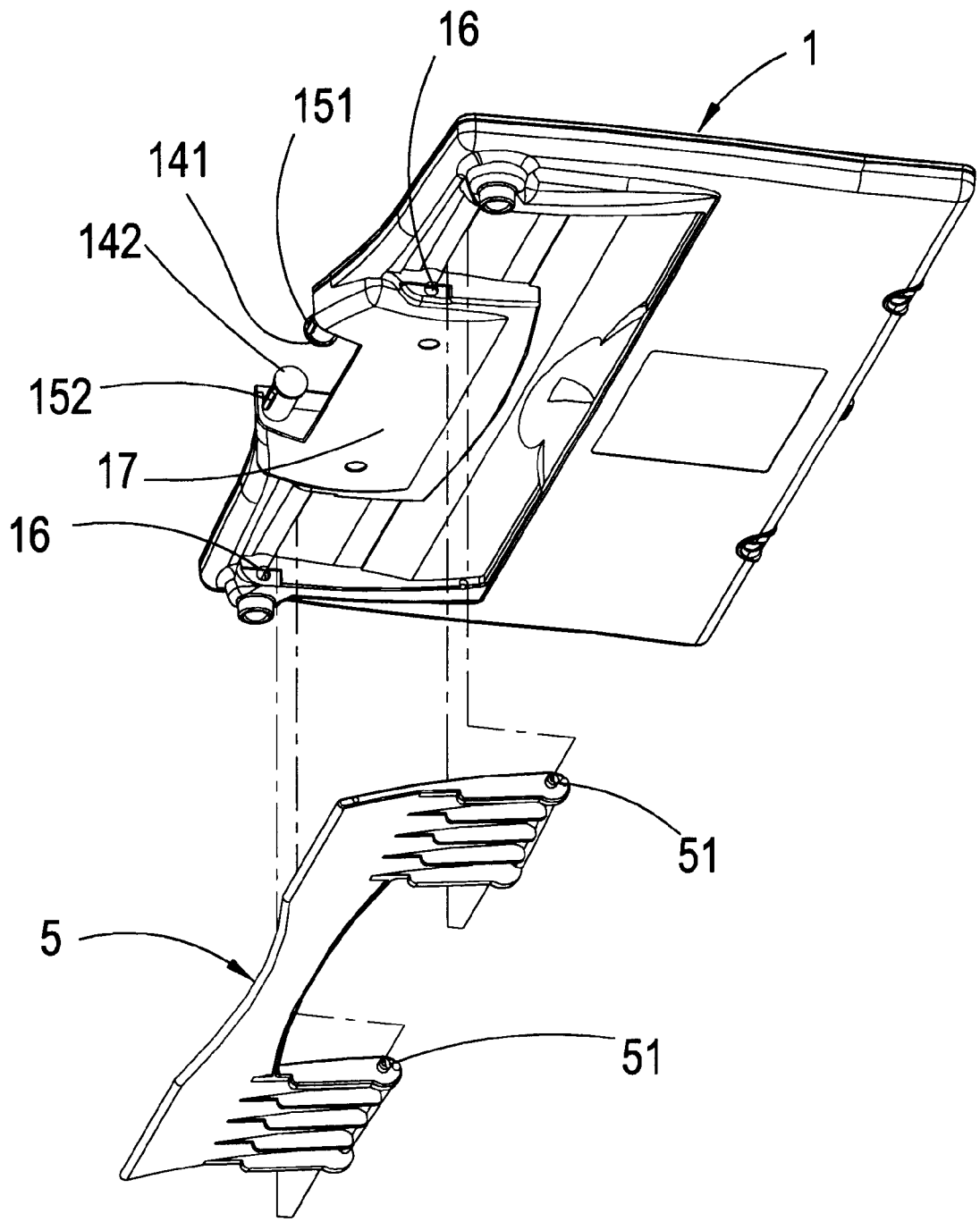
FIG. 2 is an exploded view of the bracket plate of the present invention.

Referring to FIG. 1(A), FIG. 1(B), and FIG. 2 simultaneously. These drawings are an exploded view of the component parts, a fragmentarily enlarged view of the mounting pad, and an exploded view of the bracket plate of the present invention respectively. The main body A of the present invention is composed of a keyboard 1, an upper cover 4, a mounting pad 3, and a signal transmission joint 2. The keyboard 1 is provided with an opening 13 at the uppermost portion thereof with two stubs 141 and 142 one at each side, each stub 141(142) has a protuberance 151(152) at a proper position. The lower surface of the keyboard 1 forms a supporting plane, while there are a plurality of keys 11 disposed on the upper surface thereof. A breach 12 is formed at a proper position of the upper surface of the keyboard 1. An upper cover 4 of the keyboard 1 is provided with an opening 44 at a proper position thereof, and a guide ditch 42 is formed at the edge of the opening 44, and two hooks 411 and 412 are provided each at one side of the opening 44, and a hasp 43 is provided at a proper position on the edge of the upper cover 4 to be engaged with the breach 12 formed on the keyboard 1 by trapping therein. A mounting pad 3 is composed of a pedestal 30 and a sustaining plate 31 extending therefrom. A flange 32 is formed around the edge of the sustaining plate 31, and a stopper 341(342) is provided at each side of the pedestal 30. A signal transmission joint 2 having a signal connector 21 thereon is articulated with the mounting pad 3 by forming a containment hole configurated by two arcuate edges 22 and 33 therebetween where the two stubs 141 and 142 of the opening 13 of the keyboard 1 are coupled with. The flange 32 formed around the edge of the sustaining plate 31 is trapped in the guide ditch 42 of the upper cover 4, and the two hooks 411 and 412 each provided at one side of the upper cover 4 can capture the corresponding stubs 141 and 142 of the opening 13. Furthermore, the protuberances 151 and 152 of the stubs 141 and 142 can retain the two stoppers 341, 342 of the pedestal 30. a gutter 17 is formed at the bottom portion of the keyboard 1 with two fitting holes 16 for supporting several axles 51 of a bracket plate 5 such that the bracket plate 5 may turn as shown in FIG. 5(A) and FIG. 5(B).

Figure 3A:
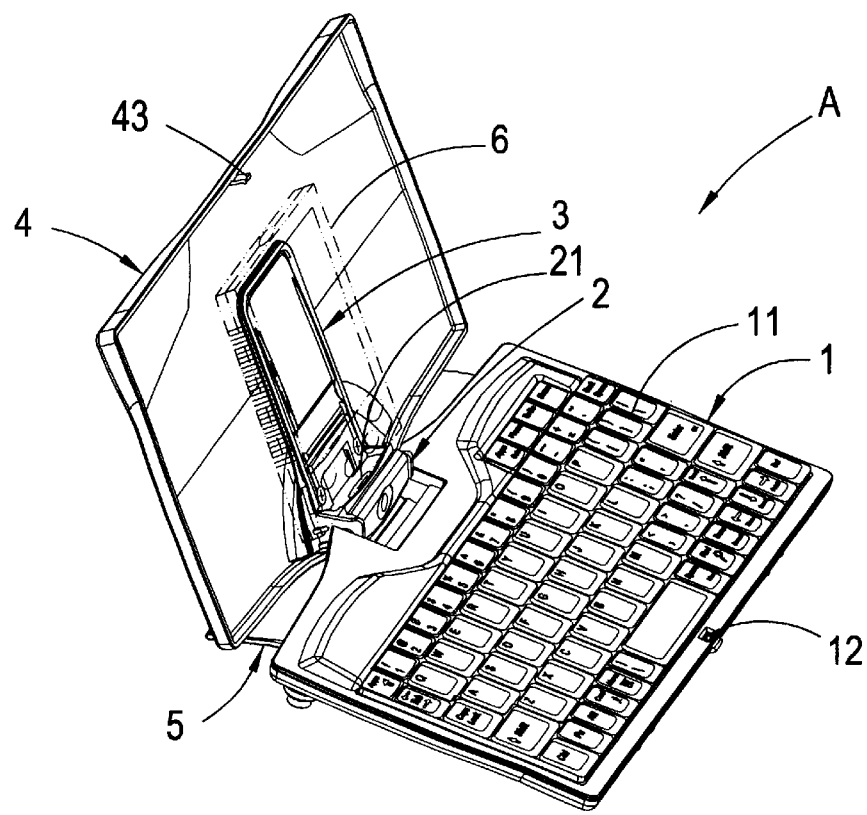
FIG. 3(A) is a three dimensional assembly view of the present invention.
Figure 3B:
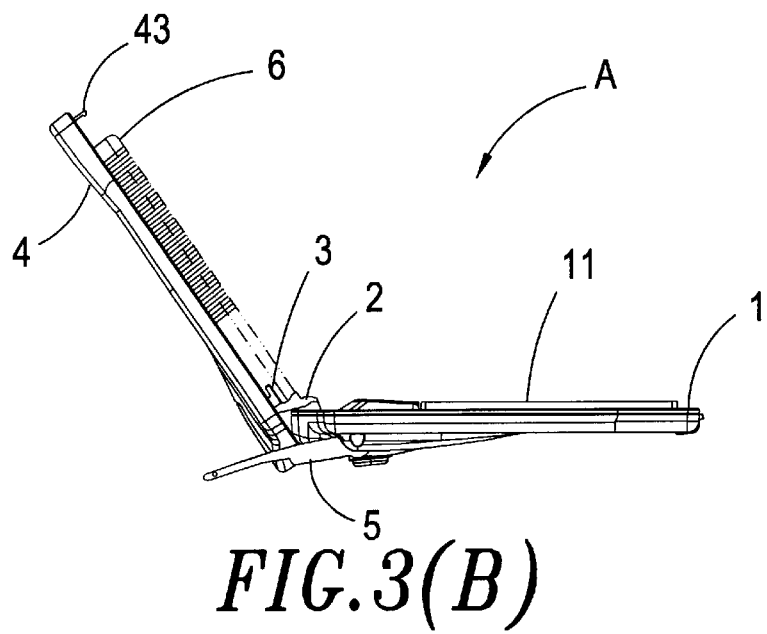
FIG. 3(B) is a side view of the present invention.

Referring to FIG. 3(A) and FIG. 3(B), the drawings are a three dimensional assembly view and a side view of the present invention respectively. After completing assembly of main body A, A portable micro computer 6 or a PDA can be put on the signal transmission joint 2 and connect its communication port with the signal connector 21 of the signal transmission joint 2. The user can securely operate the computer 6 by entraining the computer 6 on the mounting pad 3 to sustain its weight. The use of bracket plate 5 can help balancing the deviation of the center of gravity of the whole computer unit. Of course, any types of portable micro computer 6 or PDA can be used through selection of an appropriate signal transmission joint 2 and with the aid of the bracket plate 5.

Figure 4:
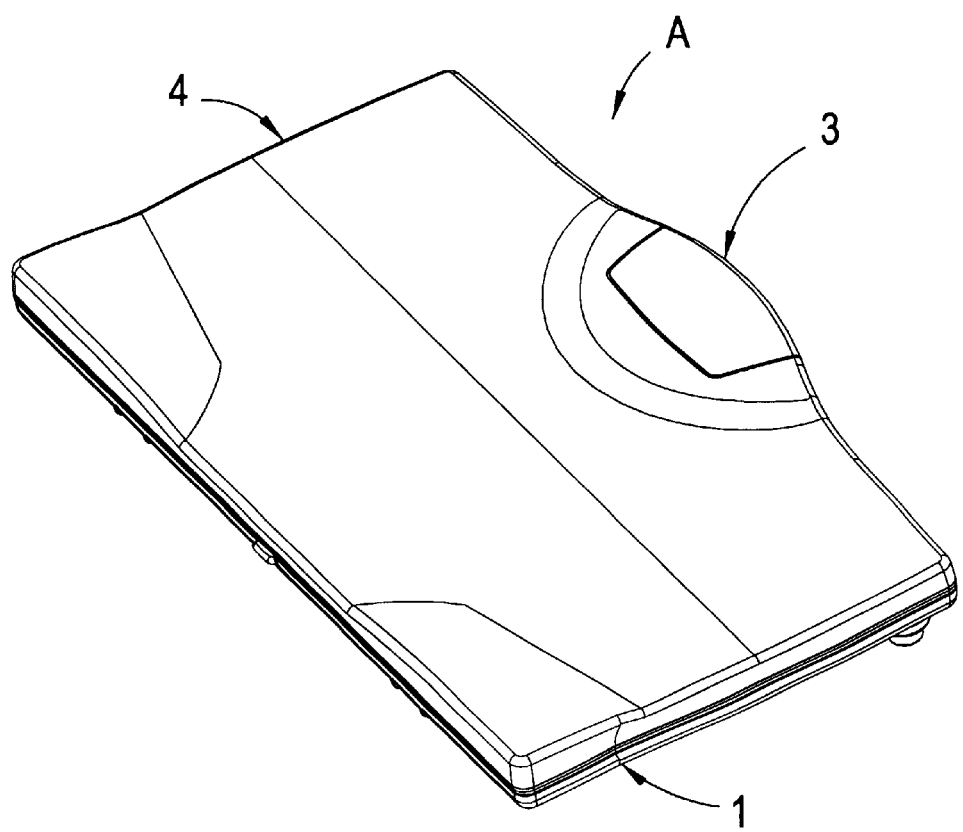
FIG. 4 is a perspective view of the present invention in folded state.

Referring to FIG. 4, the drawing is a perspective view of the present invention in folded state. It is clearly shown that the pedestal 30 of the mounting pad 3 is well fitted to the contour of the upper cover 4 when the upper cover 4 is enclosing the keyboard 1. At this time the hasp 43 (not shown) is trapped and captured in the breach 12 of the keyboard 1, and the main body A of the present invention exhibits a smart outer appearance.

Figure 5A:
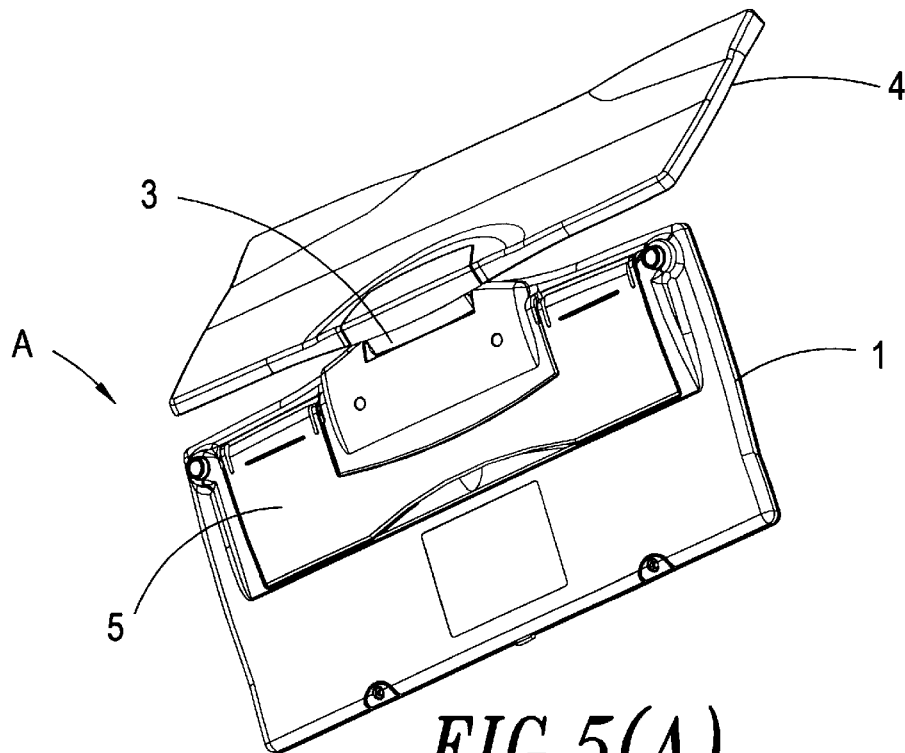
FIG. 5(A) is a perspective view of the bracket plate of the present invention in folded state.
Figure 5B:
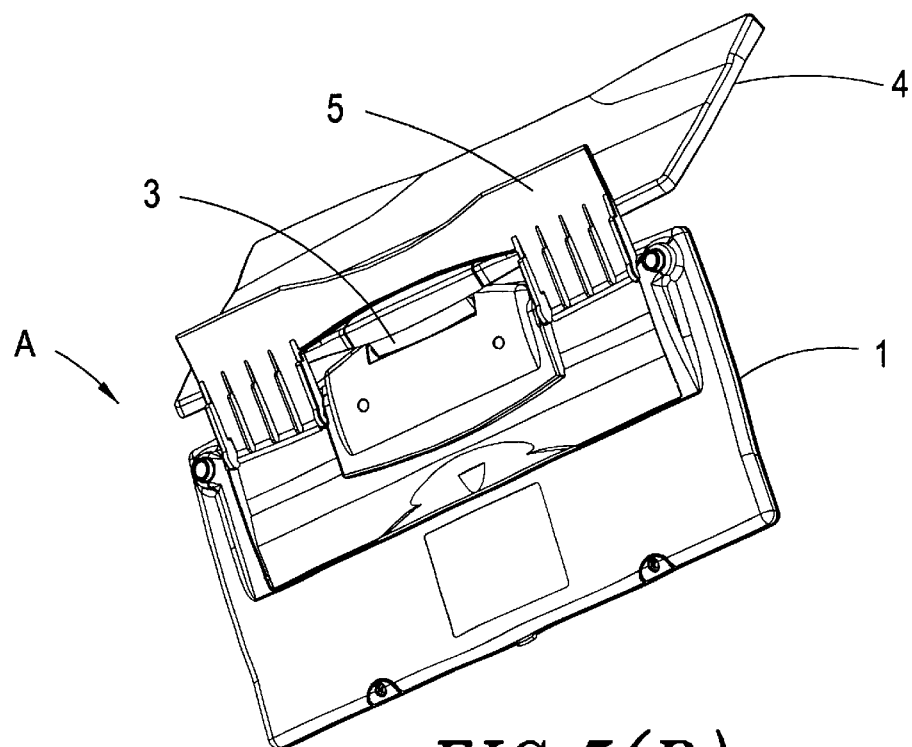
FIG. 5(B) is a perspective view of the bracket plate of the present invention in open state.

Referring to FIG. 5(A) and FIG. 5(B) the drawings show the bracket plate is in folded state [FIG. 5(A)], and in open state [FIG. 5(B)] respectively by turning as stated above.

Figure 6:
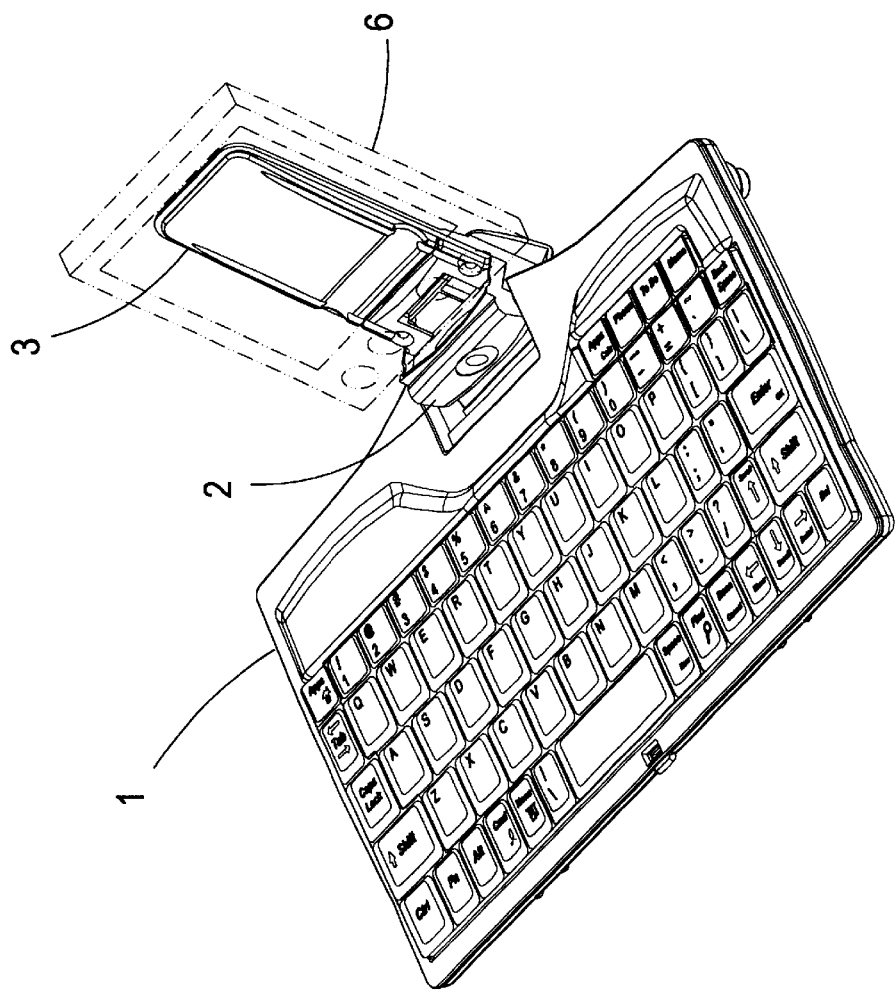
FIG. 6 is a perspective view in an embodiment the present invention wherein the releasable upper cover is removed.

Referring to FIG. 6, the drawing shows a perspective view in an embodiment of the present invention wherein the releasable upper cover 4 is removed away by the user for the conveniency of operation and better visibility.

Figure 7:
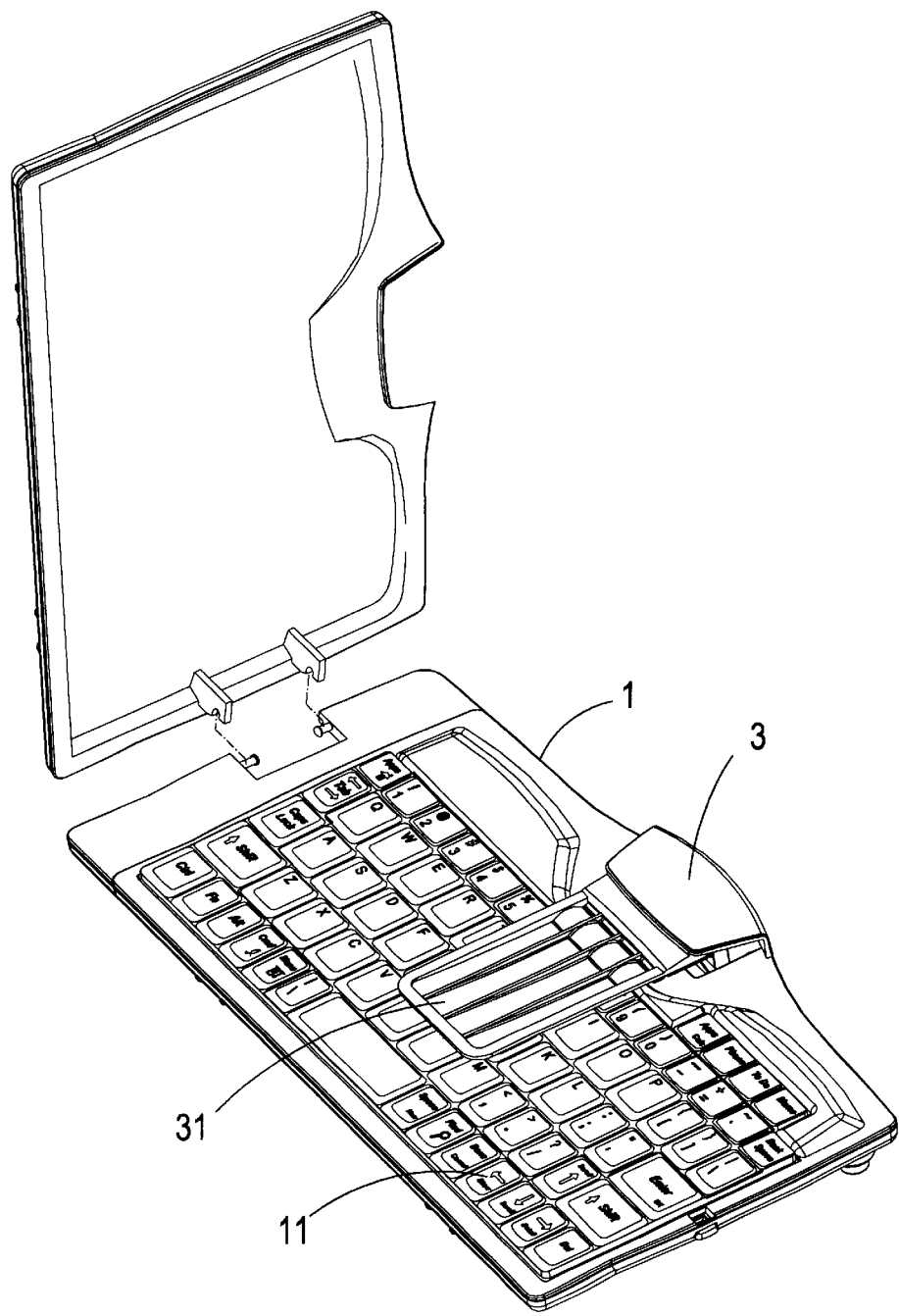
FIG. 7 is a perspective view of in another embodiment of the present invention wherein the upper cover is installed at one side of the keyboard.

Referring to FIG. 7, the drawing shows a perspective view in another embodiment of the present invention wherein the upper cover 4 is installed at left side of the keyboard 1 according to the user's own selection of the product type.

Figure 8:
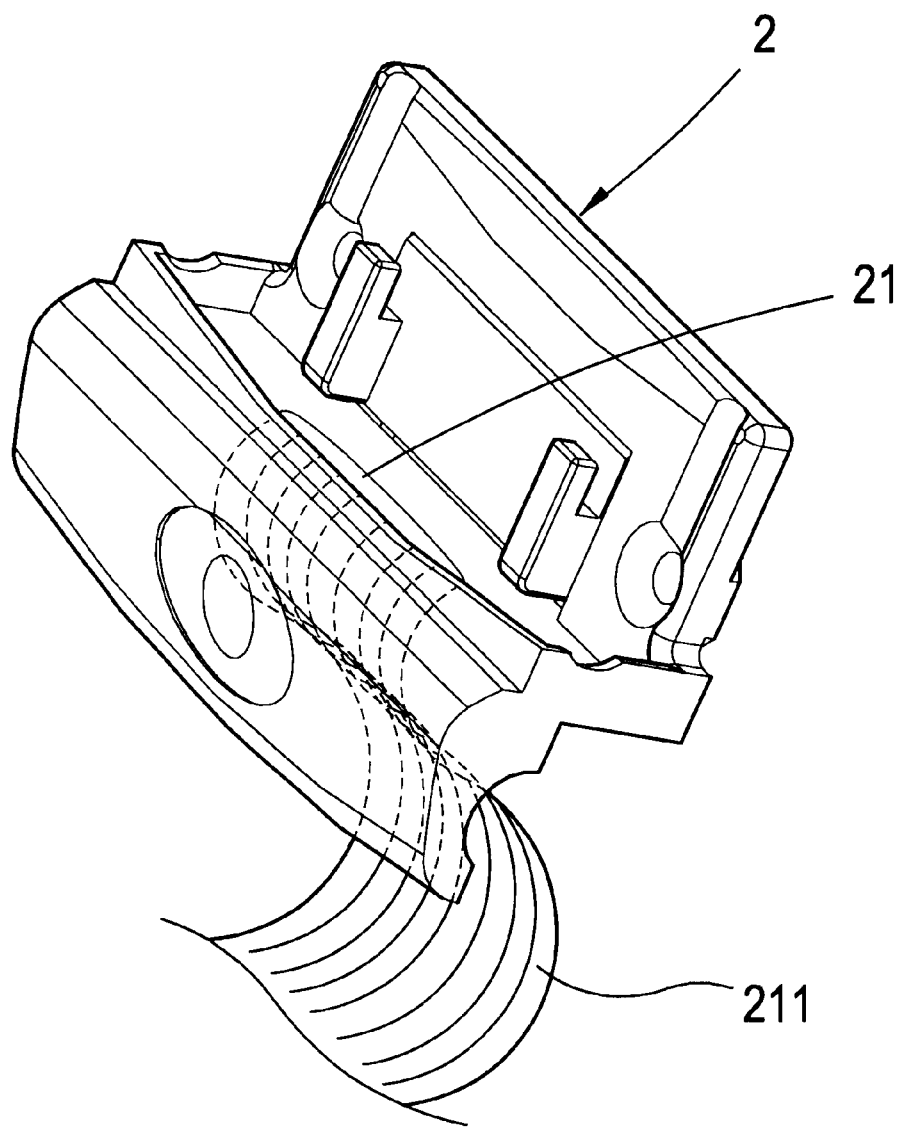
FIG. 8 is a perspective view in one more embodiment of the present invention wherein a flexible printed circuit board is connected to the signal connector.

Referring to FIG. 8, this is a perspective view in one more embodiment of the present invention wherein a flexible printed circuit board 211 is connected to the signal connector 21 for transmitting output/input signals between the keyboard 1 and the signal transmission joint 2. The FPCB 211 is well known to have several merits of: (1) withstandabe to high/low temperature, (2) effect of signal transmission is not degraded when folded, (3) highly resistive to electrostatic interference, (4) high chemical stability, (5) easy for production design and assembly minimizing production error and prolonging the lifetime, (6) compact in size with improved versatility, and (7) low production cost.

Figure 9A:
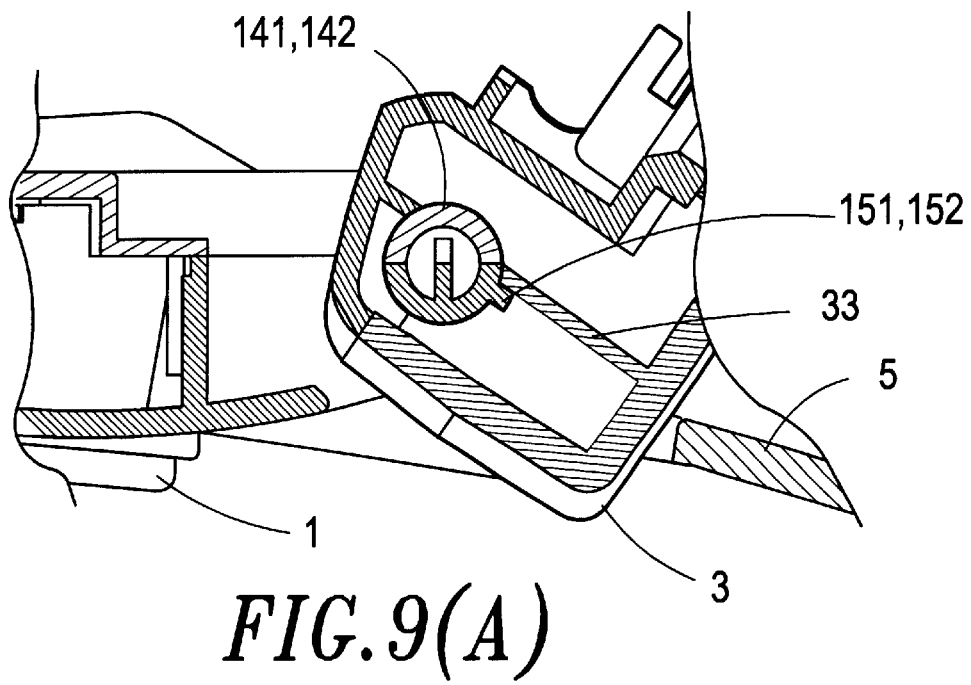
FIG. 9(A) is a perspective view of the present invention showing the mounting pad is developed with respect to the keyboard.
Figure 9B:
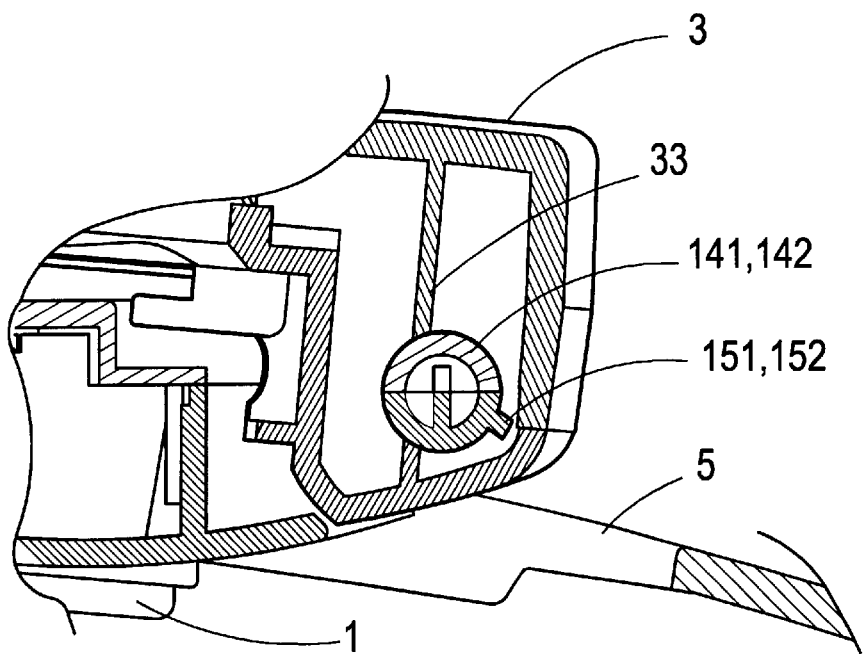
FIG. 9(B) is a perspective view of the present invention showing the mounting pad and the keyboard are folded together.

Referring to FIG. 9(A) and FIG. 9(B), the two drawings show the states that the mounting pad 3 is developed with respect to the keyboard 1 [FIG. 9(A)], and the mounting pad 3 and the keyboard 1 are folded together [FIG. 9(B)]. The angle formed between the keyboard 1 and the mounting pad 3 can be varied according to engaging position of the protuberances 151 and 152 of the stubs 151 and 152 and the stoppers 341, 342 (not shown) of the mounting pad 3.

It emerges from the above description that the present invention has several noteworthy advantages, in particular:

(1) The releasable upper cover can be installed at four sides of the keyboard for improving utilization of spacing.

(2) A thin bracket plate installed underneath the keyboard for folding the keyboard and sustaining the present invention does not increase the thickness of the keyboard when folded.

(3) The flexible printed circuit board used to transmit input/output signals causes it possible to accommodate variety of portable computers and PDAS with the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A portable computer input device comprises:

a keyboard provided with an opening at the uppermost portion thereof with two stubs each emerging inwardly and oppositely each other from respective side, and a protuberance is formed an each stub, said keyboard is supported with a supporting plane beneath, while a plurality of keys are disposed on the upper surface of said keyboard, and a breach is formed on the upper surface of said keyboard thereof;

an upper cover of said keyboard provided with an opening at a proper portion thereof, a guide ditch is formed at the edge of said opening, and two hooks are provided each at one side of said opening, and a hasp is provided at a proper position on the edge of said upper cover to be engaged with said breach formed on the upper surface of said keyboard by trapping therein;

a computer mounting pad composed of a pedestal and a sustaining plate extending therefrom, a flange is formed around the edge of said sustaining plate, and a stopper is provided at each side of said pedestal; and a signal transmission joint with a signal connector thereon;

with such a structure, said signal transmission joint is articulated with said mounting pad by forming a containment hole therebetween where said two stubs of the opening of said keyboard are coupled with, said flange formed around the edge of said sustaining plate is trapped in said guide ditch of said upper cover, and said two hooks each at one side of said upper cover captures the corresponding stubs of said opening.

2. The device of claim 1, wherein a gutter is formed at the bottom portion of said keyboard, said gutter is provided with two fitting holes for supporting several axles of a bracket plate for turning said bracket plate.

3. The device of claim 1, wherein said two protuberances of said two stubs are for retaining said two stoppers of said pedestal so as to vary the angle formed between said keyboard surface and said computer mounting pad according to engaging position of said stubs and said stoppers.

4. The device of claim 1, wherein said upper cover is optionally installed at any one of four sides of said keyboard according to contour of said keyboard, or detached.

5. The device of claim 1, wherein arrangement of keys on said keyboard depends on actual requirement.

6. The device of claim 1, wherein a flexible printed circuit board is connectable to said signal connector for transmitting signals.

* * * * *